(12) United States Patent
Schwarz

(10) Patent No.: US 6,416,266 B2
(45) Date of Patent: Jul. 9, 2002

(54) THREAD-INSERT ARRANGEMENT

(75) Inventor: Helmut Schwarz, Weil der Stadt (DE)

(73) Assignee: Schwarz Verbindungs-Systeme GmbH, Althengstett (DE)

( * ) Notice: Subject to any disclaimer, the term of this patent is extended or adjusted under 35 U.S.C. 154(b) by 0 days.

(21) Appl. No.: 09/741,885

(22) Filed: Dec. 22, 2000

(30) Foreign Application Priority Data

Dec. 24, 1999 (DE) ..................... 299 22 799 U

(51) Int. Cl.[7] .................... F16B 13/04; F16B 37/04
(52) U.S. Cl. .................... 411/38; 411/112; 411/182
(58) Field of Search .................... 411/34, 37, 38, 411/111, 112, 113, 104, 182, 183

(56) References Cited

U.S. PATENT DOCUMENTS

| | | | | |
|---|---|---|---|---|
| 4,929,136 A | * | 5/1990 | Mee | 411/112 X |
| 5,028,189 A | * | 7/1991 | Harley | 411/112 X |
| 5,074,726 A | * | 12/1991 | Betchel et al. | 411/38 X |
| 5,380,136 A | * | 1/1995 | Copple et al. | 411/104 X |

FOREIGN PATENT DOCUMENTS

| | | |
|---|---|---|
| DE | 2630344 | 2/1977 |
| DE | 4102164 | 7/1992 |

* cited by examiner

*Primary Examiner*—Neill Wilson
(74) *Attorney, Agent, or Firm*—Greenblum & Bernstein, P.L.C.

(57) ABSTRACT

A thread-insert device is provided including a hollow-cylinder shaped sleeve part having an upper and lower sleeve edge and at least one supporting recess located on said upper sleeve edge; and a hollow-cylinder shaped thread insert, having two ends, a central axis, internal threads, and at least one supporting edge part projecting outwardly at one end of the thread-insert substantially perpendicularly to the central axis. The at least one supporting edge part is structured to be received by the at least one supporting recess, wherein the at least one supporting edge part is movable within the at least one supporting recess, and wherein the thread insert is movable within the sleeve part.

24 Claims, 2 Drawing Sheets

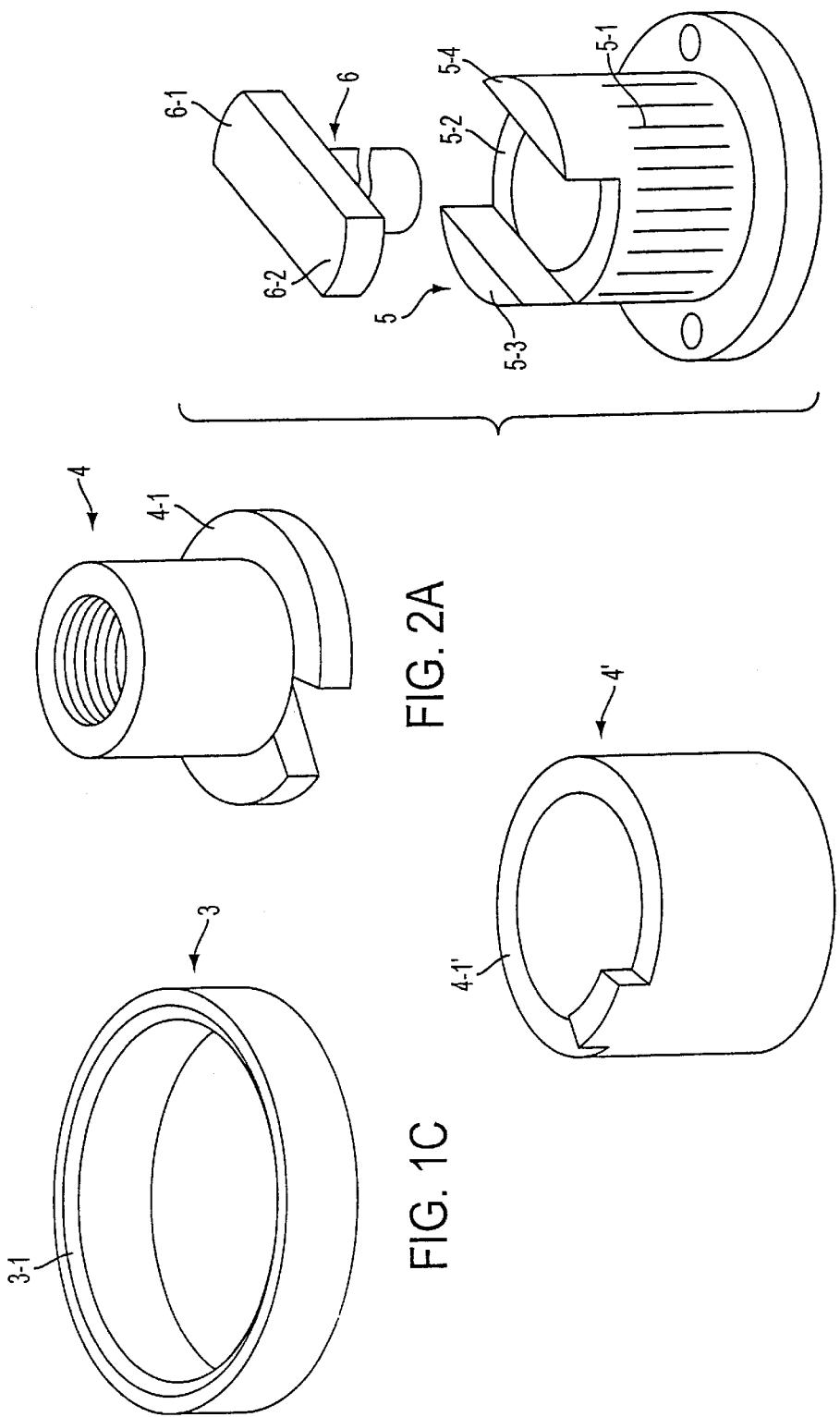

THREAD-INSERT ARRANGEMENT

CROSS-REFERENCE TO RELATED APPLICATIONS

The present application claims priority under 35 U.S.C. § 119 of German Patent Application No. 299 22 799.5, filed on Dec. 24, 1999, the disclosure of which is expressly incorporated by reference herein in its entirety.

BACKGROUND OF THE INVENTION

1. Field of the Invention

The invention concerns a thread-insert arrangement fastening arrangement which permits ease of installation by including tolerance compensation and/or centering upon making the bolt connection.

2. Discussion of Background Information

Thread-insert arrangements are used in components to permit joining by means of bolts. The actual thread insert, a part similar to a hollow cylinder with interior thread, is inserted into the hole of a component plate. The thread insert can be bonded, calked, screwed or cast into place in the component.

For fastening interior paneling in aircraft and vehicles, thread-insert arrangements are used which permit tolerance compensation and/or centering when making the bolt connection.

Thread-insert arrangements of this kind always comprise two parts: a sleeve part which is attached permanently to the component, and the actual thread insert, which is located loosely in the sleeve part and can be moved or turned to a limited extent within the sleeve part.

For centering purposes, the thread insert has a slant which guides to the interior thread. A thread-insert arrangement of this kind known to prior art (manufacturer: Shur-Lok Corporation, USA, order no. SL6065 series) is shown in FIG. 3. Sleeve part 5 and thread insert 6 are made of metal. The sleeve part is bonded or cast onto the component which is generally of plastic. It has ribbing 5-1. on the exterior which prevents it from turning in its seat. The upper open sleeve edge has a milled recess 5-2 between two wall parts 5-3 and 5-4 positioned opposite one another.

The actual thread insert 6 has a bar with two supporting edge parts 6-1 and 6-2 which point outwards. The bar of the thread insert is located in the milled slot 5-2. Here, it lies against the sleeve edge and can be shifted and turned within the slot. In order to limit movement, the interior sleeve wall functions as a stop for the outer wall of the interior thread part 6. In order to limit turning, the wall parts 5-3 and 5-4 act as a stop for the bar.

Thread inserts of this type have the following disadvantages: high weight (especially undesirable in aircraft manufacture) due to the sleeve part made of metal, high manufacturing costs for the sleeve part made of metal, only two support points for the support bar on the sleeve wall.

SUMMARY OF THE INVENTION

An aspect of the invention is to provide a thread-insert arrangement which allows a more even distribution of the contact surfaces on the sleeve wall. In another version of the invention, an aspect is to provide a thread-insert arrangement which is lighter in weight or a thread-insert arrangement with low manufacturing costs.

According to an aspect of the invention, a thread-insert arrangement is provided, with a hollow-cylinder shaped sleeve part and a hollow-cylinder shaped thread insert with internal thread arranged therein. At least three outward-pointing supporting edge parts are arranged on one opening of the thread insert and supporting recesses to receive the supporting edge parts are provided on an opening of the sleeve part. The thread insert with its supporting edge parts can rotate in the area of the supporting recesses and the thread insert can be moved to the side within the sleeve part.

According to another aspect of the present invention, four supporting edge parts are provided. In another aspect of the present invention, the four supporting edge parts are designed like fingers. According to a further aspect of the present invention, the supporting edge parts are arranged symmetrically. In another aspect of the invention, a supporting recess is assigned to each of the supporting edge parts. In another aspect of the present invention, an even number of radially symmetrically arranged edge parts, where supporting recesses located diametrically opposite have base surfaces and sides aligned with one another.

According to a further aspect of the present invention, a thread-insert arrangement, with a hollow-cylinder shaped sleeve part and a hollow-cylinder shaped thread insert with internal thread arranged therein, is provided. An outward-pointing supporting edge part is arranged on one opening of the thread insert and a supporting recess to receive the supporting edge part is provided on an opening of the sleeve part. The thread insert with its supporting edge part can rotate in the area of the supporting recess and the thread insert can be moved to the side within the sleeve part.

According to still a further aspect of the present invention, the supporting edge part and the supporting recess is in the form of a ring segment. In another aspect of the present invention, the outer wall of the sleeve part has recesses for a non-twisting connection with a component. In another aspect of the present invention, a cap covering the sleeve opening with the supporting recesses is provided. According to a further aspect of the invention, the cap has an interior edge bead which fits over an outer sleeve shoulder. In another aspect of the invention, the sleeve is made of plastic.

According to an aspect of the present invention, a thread-insert device, is provided including a hollow-cylinder shaped sleeve part having an upper and lower sleeve edge and at least one supporting recess located on said upper sleeve edge; and a hollow-cylinder shaped thread insert, having two ends, a central axis, internal threads, and at least one supporting edge part projecting outwardly at one end of said thread insert substantially perpendicularly to the central axis. The at least one supporting edge part is structured to be received by the at least one supporting recess, wherein the at least one supporting edge part is movable within the at least one supporting recess, and wherein the thread insert is movable within said sleeve part.

According to another aspect of the present invention, the at least one supporting edge part includes three supporting edge parts. In another aspect of the present invention, the at least one supporting edge part includes four supporting edge parts. According to a further aspect of the present invention, the at least one supporting edge part is formed as one of a finger, projection, tab, and arm.

According to still a further aspect of the present invention, the at least one supporting edge part includes a plurality of supporting edge parts arranged symmetrically to the central axis. In another aspect of the present invention, each the at least one supporting recess is assigned to a respective one of the at least one supporting edge parts, respectively.

According to a still further aspect of the present invention, the at least one supporting edge part includes an even number of symmetrically arranged edge parts, wherein the at least one supporting recess comprises a same even number of supporting recesses arranged diametrically opposite each other, and wherein the supporting recesses have supporting surfaces and side walls aligned with each other.

Further aspects of the invention include the sleeve part including an outer wall with at least one recess for a non-twisting connection with a component. According to other aspects of the invention, a cap adapted to cover the at least one supporting recess by being attached to the upper sleeve edge is provided. According to another aspect of the present invention, the cap has an interior edge bead which fits over an outer sleeve shoulder of the upper sleeve edge. According to a still further aspect of the invention, the sleeve is made of plastic.

According to an aspect of the present invention, a thread-insert device is provided, including a hollow-cylinder shaped sleeve part having an upper and lower sleeve edge and one supporting recess located on said upper sleeve edge; and a hollow-cylinder shaped thread insert, having two ends, a central axis, internal threads, and one supporting edge part projecting outwardly at one end of said thread insert substantially perpendicularly to the central axis. The supporting edge part is structured to be received by the supporting recess, wherein the supporting edge part is movable within the supporting recess, and wherein the thread insert is movable within the sleeve part. According to an aspect of the present invention, the supporting edge part and the supporting recess is in the form of a ring segment.

According to another aspect of the present invention, a threaded coupling device is provided, including a tubular body having internal threads and an end connected to a supporting element having at least one supporting edge part which projects beyond an outer surface of the tubular body and substantially perpendicularly to a tube axis; and a sleeve part having an axial bore with a center axis arranged to receive the tubular body, which extends from a recessed side to a bottom side, wherein the recessed side has at least one supporting recess arranged to receive the at least one supporting edge part.

In another aspect of the present invention, the at least one supporting edge comprises an edge part. According to a further aspect of the present invention, the at least one supporting edge comprises a plurality of edge parts. According to a still further aspect of the present invention, the plurality of edge parts is oriented in a radially outward and symmetric arrangement. According to a still further aspect of the present invention, the supporting element and the plurality of edge parts are integrally formed in a sprocket shape.

According to a still further aspect of the present invention, the at least one supporting recess comprises one recess. In another aspect of the present invention, the at least one supporting recess comprises a plurality of recesses. According to an aspect of the present invention, the plurality of edge parts extend are oriented in a radially outward and symmetric arrangement.

According to a further aspect of the present invention, the recessed side and said bottom side are connected by a plurality of radially spaced braces. In another aspect of the present invention, a cap is adapted to cover the recess side of said sleeve part. Further aspects of the invention include at least one edge part is rotatably movable within the at least one supporting recess. According to other aspects of the present invention, the tubular body is transversely movable with respect to the central axis of the sleeve part.

According to another aspect of the present invention, while the at least one supporting recess supports the at least one edge part, the tubular body is movable within the sleeve part. According to a still further aspect of the invention, while at least one supporting recess supports the at least one edge part, the at least one edge part is movable within the at least one supporting recess.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1C is a perspective view of a cap for the sleeve part for covering the thread insert with the supporting edge parts;

FIG. 2A is a perspective view of a thread insert in accordance with the invention with only one support edge part pointing outwards;

FIG. 2B is a perspective view of a sleeve part in accordance with the invention for receiving the thread insert as shown in FIG. 2A; and FIG. 3 is a simplified perspective view of a thread insert arrangement as known to prior art.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1A:
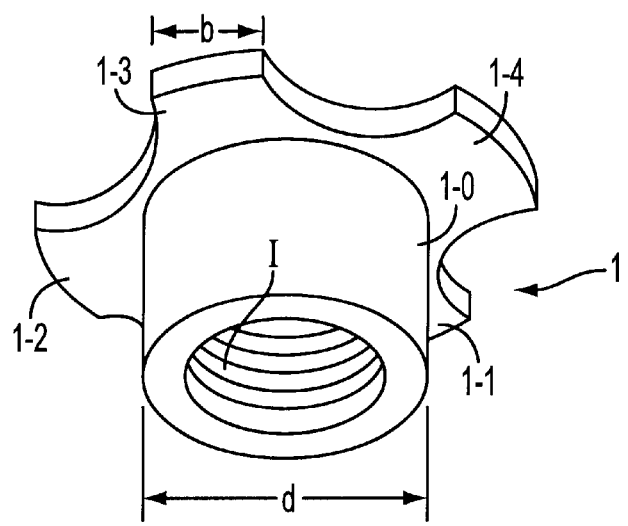
FIG. 1A is a perspective view of the thread insert in accordance with the invention, with four ray-like supporting edge parts pointing outwards.

FIG. 1A shows a perspective view of a thread insert in accordance with the invention, with four ray-like outwardly-pointing supporting edge parts 1-1, 1-2, 1-3, 1-4. The thread-insert arrangement comprises principally a sleeve part 2 in the shape of a hollow cylinder (FIG. 1B) and a thread insert 1 in the shape of a hollow cylinder (FIG. 1A) with interior thread I located inside it.

The thread insert 1 (FIG. 1A) has four supporting edge parts 1-1, 1-2, 1-3 and 1-4 which point outwards and which are arranged radially symmetrically. A thread insert of this kind is easily manufactured, e.g. by stamping and deep drawing from sheet material, and then forming the thread by a non-cutting operation. The supporting edge parts 1-1, 1-2, 1-3 and 1-4 are arranged to lie in the recesses 2-1, 2-2, 2-3, 2-4 on the sleeve wall (FIG. 1B).

Figure 1B:
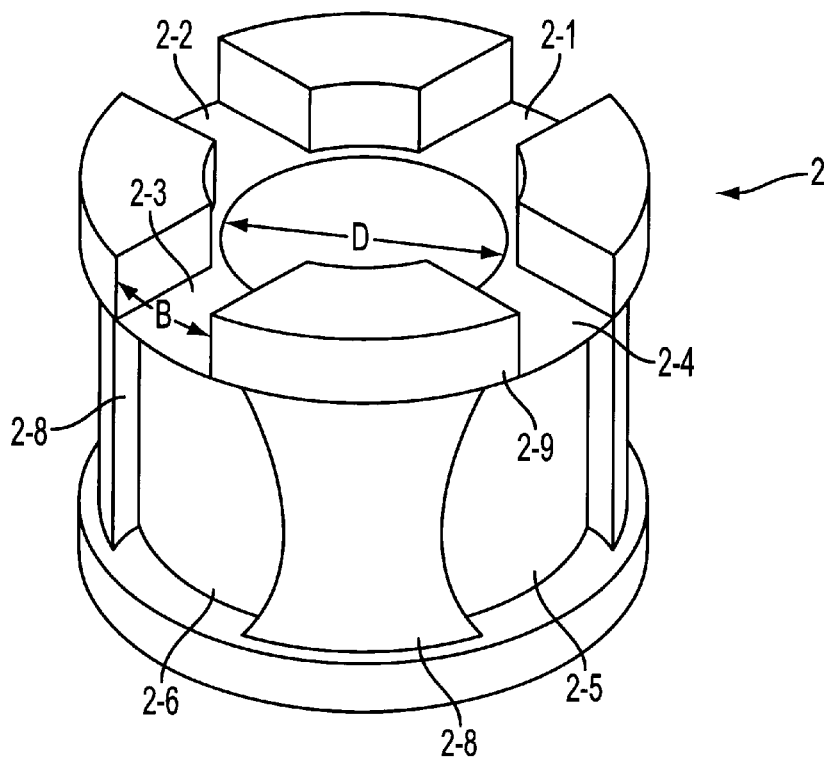
FIG. 1B is a perspective view of a sleeve part in accordance with the invention for receiving the thread insert as shown in FIG. 1A.

FIG. 1B shows a perspective view of a sleeve part 2 in accordance with the invention for receiving the thread insert as shown in FIG. 1A. On an opening of the sleeve part 2, there are recesses 2-1, 2-2, 2-3, 2-4 to receive the supporting edge parts edge parts 1-1, 1-2, 1-3 and 1-4 of the thread insert 1. The recess width B of each supporting recess is slightly greater than the width b of a supporting edge part, so that this can be turned to a limited extent in the area of the supporting recess.

The thread insert 1 has an outer diameter d, which is slightly smaller than the interior diameter D of the sleeve 2. This allows a limited sideways movement of the thread insert within the sleeve part 2, in the plane on which the supporting surfaces of the sleeve for the supporting edge parts lie.

FIG. 1C shows a perspective view of a cap 3 for the sleeve part 2 for covering the thread insert 1 with the supporting edge parts. After introducing the thread insert 1 into the sleeve part 2, this cap is located above the sleeve opening.

The cap 3 ensures that the thread insert 1 cannot drop out of the sleeve 2 and also covers the area of the supporting recesses 2-1, 2-2, 2-3, 2-4. In this way, this area is protected when the thread-insert arrangement is bonded or cast onto a component.

Cap 3 has an interior bead edge 3-1 which fits over a shoulder 2-9 when the cap is placed on the sleeve opening. The sleeve exterior has recesses 2-5, 2-6 and braces 2-8 between the upper edge (or recess side) and lower outwardly-pointing sleeve edge (bottom side). This design allows the thread-insert arrangement to be cast into a component without twisting. The use of plastic or synthetic adhesives is recommended for the casting process.

The thread connection is made at the opening of the sleeve part which is facing away from the cap. The plastic injection-molding process is recommended for the sleeve part 2. This process is simpler and more economical than using metallic sleeves. Plastic material is also lower in weight.

With the thread-insert arrangement in accordance with the invention, the number of supporting edge parts of the thread insert may also be 1 or more (e.g. 2, 3, 4, 5 etc.). An axial symmetric arrangement is preferable for several supporting edge parts. A thread-insert arrangement with four supporting edge parts has proved to be particularly effective.

FIG. 2A shows a perspective view of a thread insert 4 in accordance with the invention with only one support edge part 4-1 pointing outwards, while FIG. 2B shows a perspective view of the appropriate sleeve part 4' in accordance with the invention for receiving the thread insert in accordance with FIG. 2A. With a design of this type, there is an especially large supporting surface 4-1 ' for the supporting edge part 4-1 of the thread insert.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A thread-insert device, comprising:
    a hollow-cylinder shaped sleeve part having an upper and lower sleeve edge and at least one supporting recess located on said upper sleeve edge; and
    a hollow-cylinder shaped thread insert, having two ends, a central axis, internal threads, and at least three supporting edge parts projecting outwardly at one end of said thread insert substantially perpendicularly to the central axis;
    wherein said at least three supporting edge parts are structured to be received by said at least one supporting recess, wherein said at least three supporting edge parts are movable within said at least one supporting recess, and wherein said thread insert is movable within said sleeve part.

2. The thread-insert device according to claim 1, wherein said at least three supporting edge parts comprise four supporting edge parts.

3. The thread-insert device according to claim 1, wherein said at least three supporting edge parts are formed as one of a finger, projection, tab, and arm.

4. The thread-insert device according to claim 1, wherein said at least three supporting edge parts comprise a plurality of supporting edge parts arranged symmetrically to the central axis.

5. The thread-insert device according to claim 1, wherein each said at least one supporting recess is assigned to a respective one of said at least three supporting edge parts, respectively.

6. The thread-insert device according to claim 1, wherein said at least three supporting edge parts comprise an even number of symmetrically arranged edge parts, said at least one supporting recess comprises a same even number of supporting recesses arranged diametrically opposite each other, and wherein said supporting recesses have supporting surfaces and side walls aligned with each other.

7. The thread-insert device according to claim 1, wherein said sleeve is made of plastic.

8. A thread-insert device, comprising:
    a hollow-cylinder shaped sleeve part having an upper and lower sleeve edge and at least one supporting recess located on said upper sleeve edge; and
    a hollow-cylinder shaped thread insert, having two ends, a central axis, internal threads, and at least one supporting edge part projecting outwardly at one end of said thread insert substantially perpendicularly to the central axis;
    wherein said at least one supporting edge part is structured to be received by said at least one supporting recess, wherein said at least one supporting edge part is movable within said at least one supporting recess, and wherein said thread insert is movable within said sleeve part,
    said sleeve part comprising an outer wall with at least one recess for a non-twisting connection with a component.

9. A thread-insert device, comprising:
    a hollow-cylinder shaped sleeve part having an upper and lower sleeve edge and at least one supporting recess located on said upper sleeve edge; and
    a hollow-cylinder shaped thread insert, having two ends, a central axis, internal threads, and at least one supporting edge part projecting outwardly at one end of said thread insert substantially perpendicularly to the central axis;
    wherein said at least one supporting edge part is structured to be received by said at least one supporting recess, wherein said at least one supporting edge part is movable within said at least one supporting recess, and wherein said thread insert is movable within said sleeve part, further including a cap adapted to cover said at least one supporting recess by being attached to said upper sleeve edge.

10. The thread-insert device according to claim 9, wherein said cap has an interior edge bead which fits over an outer sleeve shoulder of said upper sleeve edge.

11. A thread-insert device, comprising:

a hollow-cylinder shaped sleeve part having an upper and lower sleeve edge and at least one supporting recess located on said upper sleeve edge; and a hollow-cylinder shaped thread insert, having two ends, a central axis, internal threads, and three supporting edge parts projecting outwardly at one end of said thread insert substantially perpendicularly to the central axis;

wherein said three supporting edge parts are structured to be received by said at least one supporting recess, wherein said three supporting edge parts are movable within said at least one supporting recess, and wherein said thread insert is movable within said sleeve part.

12. The thread-insert device according to claim 11, wherein said three supporting edge parts and said at least one supporting recess are in the form of a ring segment.

13. A threaded coupling device, comprising:

a tubular body having internal threads and an end connected to a supporting element having at least three supporting edge parts which project beyond an outer surface of said tubular body and substantially perpendicularly to a tube axis; and a sleeve part having an axial bore with a center axis arranged to receive said tubular body, which extends from a recessed side to a bottom side, wherein said recessed side has at least one supporting recess arranged to receive said at least three supporting edge parts.

14. The threaded coupling device according to claim 13, wherein said at least three supporting edge parts are oriented in a radially outward and symmetric arrangement.

15. The threaded coupling device according to claim 14, wherein said supporting element and said at least three supporting edge parts are integrally formed in a sprocket shape.

16. The threaded coupling device according to claim 13, wherein said at least one supporting recess comprises one recess.

17. The threaded coupling device according to claim 13, wherein said at least one supporting recess comprises a plurality of recesses.

18. The threaded coupling device according to claim 17, wherein said at least three supporting edge parts are oriented in a radially outward and symmetric arrangement.

19. The thread coupling device according to claim 13, wherein said at least three supporting edge parts are rotatably movable within said at least one supporting recess.

20. The thread coupling device according to claim 13, wherein said tubular body is transversely movable with respect to the central axis of said sleeve part.

21. The thread coupling device according to claim 13, wherein, while said at least one supporting recess supports said at least three supporting edge parts, said tubular body is movable within said sleeve part.

22. The thread coupling device according to claim 13, wherein, while said at least one supporting recess supports said at least three supporting edge parts, said at least three supporting edge parts are movable within said at least one supporting recess.

23. A threaded coupling device, comprising:

a tubular body having internal threads and an end connected to a supporting element having at least one supporting edge part which projects beyond an outer surface of said tubular body and substantially perpendicularly to a tube axis; and a sleeve part having an axial bore with a center axis arranged to receive said tubular body, which extends from a recessed side to a bottom side, wherein said recessed side has at least one supporting recess arranged to receive said at least one supporting edge part, wherein said recessed side and said bottom side are connected by a plurality of radially spaced braces.

24. A threaded coupling device, comprising:

a tubular body having internal threads and an end connected to a supporting element having at least one supporting edge part which projects beyond an outer surface of said tubular body and substantially perpendicularly to a tube axis; and a sleeve part having an axial bore with a center axis arranged to receive said tubular body, which extends from a recessed side to a bottom side, wherein said recessed side has at least one supporting recess arranged to receive said at least one supporting edge part, further comprising a cap adapted to cover said recess side of said sleeve part.

* * * * *